US011268351B2

(12) United States Patent
Karale et al.

(10) Patent No.: US 11,268,351 B2
(45) Date of Patent: Mar. 8, 2022

(54) FRACTURING TREATMENTS THAT SYSTEMATICALLY ADD COMPLEXITY IN THE FORMATION

(71) Applicant: HALLIBURTON ENERGY SERVICES, INC., Houston, TX (US)

(72) Inventors: Chaitanya Mallikarjun Karale, Spring, TX (US); Ubong Akpan Inyang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

(21) Appl. No.: 16/237,276

(22) Filed: Dec. 31, 2018

(65) Prior Publication Data

US 2020/0208499 A1   Jul. 2, 2020

(51) Int. Cl.
*E21B 41/00* (2006.01)
*E21B 47/09* (2012.01)
(Continued)

(52) U.S. Cl.
CPC .......... *E21B 41/0092* (2013.01); *E21B 41/00* (2013.01); *E21B 43/00* (2013.01);
(Continued)

(58) Field of Classification Search
CPC .. E21B 41/00; E21B 41/0092; E21B 41/0099; E21B 43/16; E21B 43/00; E21B 43/267; E21B 43/26; E21B 47/06
See application file for complete search history.

(56) References Cited

U.S. PATENT DOCUMENTS 5,238,067 A * 8/1993 Jennings, Jr. ............ C09K 8/62
166/307
9,085,975 B2   7/2015 Abad
(Continued)

FOREIGN PATENT DOCUMENTS

EP   2884043   6/2015
WO  2014105451  7/2014
(Continued)

OTHER PUBLICATIONS

PCT/US2019/014233, "International Search Report and Written Opinion", dated Sep. 26, 2019, 12 pages.
(Continued)

*Primary Examiner* — George S Gray
(74) *Attorney, Agent, or Firm* — Kilpatrick Townsend & Stockton LLP

(57) ABSTRACT

A system and method for systemically generating complexity through a formation may include defining a diverter schedule including a set of diverters to be pumped into a wellbore over a duration of time. The system and method may include a first diverter being pumped into the wellbore based on the diverter schedule, the first diverter including matter corresponding to a first mesh value. An onset of pressure response value may be determined using a pressure sensor during or after pumping the first diverter into the wellbore. A next diverter including particles corresponding to a second mesh value may be selected using the onset of pressure response value and the diverter schedule. The next diverter may then pumped into the wellbore.

26 Claims, 7 Drawing Sheets

(51) Int. Cl.
  *E21B 43/267* (2006.01)
  *E21B 43/16* (2006.01)
  *E21B 43/00* (2006.01)
  *G06Q 10/06* (2012.01)
  *E21B 47/06* (2012.01)
  *G06N 20/00* (2019.01)

(52) U.S. Cl.
  CPC ............ *E21B 43/16* (2013.01); *E21B 43/267* (2013.01); *E21B 47/06* (2013.01); *G06Q 10/06* (2013.01); *G06N 20/00* (2019.01)

(56) References Cited

U.S. PATENT DOCUMENTS

| | | | |
|---|---|---|---|
| 9,135,475 | B2 | 9/2015 | Lecerf et al. |
| 9,938,811 | B2 | 4/2018 | Bestaoui-spurr et al. |
| 2014/0174737 | A1* | 6/2014 | Reddy .................. E21B 43/267 166/281 |
| 2015/0075778 | A1 | 3/2015 | Walters et al. |
| 2017/0122077 | A1 | 5/2017 | Shahri et al. |
| 2017/0247995 | A1 | 8/2017 | Crews et al. |

FOREIGN PATENT DOCUMENTS

| | | | |
|---|---|---|---|
| WO | 2016025936 | 2/2016 | |
| WO | WO-2017052527 A1 * | 3/2017 | ............... C09K 8/62 |
| WO | 2018022044 | 2/2018 | |
| WO | 2018022045 | 2/2018 | |
| WO | WO-2018022045 A1 * | 2/2018 | ........... E21B 43/267 |
| WO | 2018094123 | 5/2018 | |

OTHER PUBLICATIONS

Ugueto et al., "Challenging Assumptions About Fracture Stimulation Placement Effectiveness Using Fiber Optice Distributed Sensing Diagnostics: Diversion, Stage Isolation and Overflushing", Society of Petroleum Engineers, 2015, pp. 1-12.

Viswanathan et al., "Sequenced Fracture Treatment Diversion Enhances Horizontal Well Completions in the Eagle Ford Shale", Society of Petroleum Engineers, 2014, pp. 1-11.

Wheaton et al., "A Case Study of Completion Effectiveness in the Eagle Ford Shale Using DAS/DTS Observations and Hydraulic Fracture Modeling", Society of Petroleum Engineers, 2016, pp. 1-11, Feb. 2016.

* cited by examiner

| Stage / Size | X=1 | X=2 | X=3 | X=4 | X=5 |
|---|---|---|---|---|---|
| 100 Mesh | 70% | 50% | 30% | 20% | 0% |
| 60 Mesh | 30% | 40% | 50% | 30% | 0% |
| 30 Mesh | 0% | 10% | 10% | 20% | 30% |
| 8 Mesh | 0% | 0% | 10% | 30% | 50% |

FIG. 6

FRACTURING TREATMENTS THAT SYSTEMATICALLY ADD COMPLEXITY IN THE FORMATION

TECHNICAL FIELD

The present disclosure relates generally to operations connected with stimulation of production from a wellbore. More particularly, the present disclosure relates to dynamic control of wellbore injections to systemically add complexity in a formation.

BACKGROUND

A well system for oil or gas production can include a wellbore drilled through a subterranean formation. Perforations within the wellbore can enable fluid to be injected through the perforations to create fractures in the subterranean formation. The fractures can enable hydrocarbons to flow from the subterranean formation into the wellbore, from which the hydrocarbons can be extracted. A material known as "diverter" can also be pumped into a well during or prior to injection of the fluid. Diverter accumulates in the wellbore at strategic locations in order to divert the fluid into the portions of the wellbore where its effects can be more advantageous.

BRIEF DESCRIPTION OF THE DRAWINGS

Illustrative aspects of the present disclosure are described in detail below with reference to the following drawing figures:

FIG. 6 illustrates a diverter schedule according aspects of the present disclosure.

Figure 1:
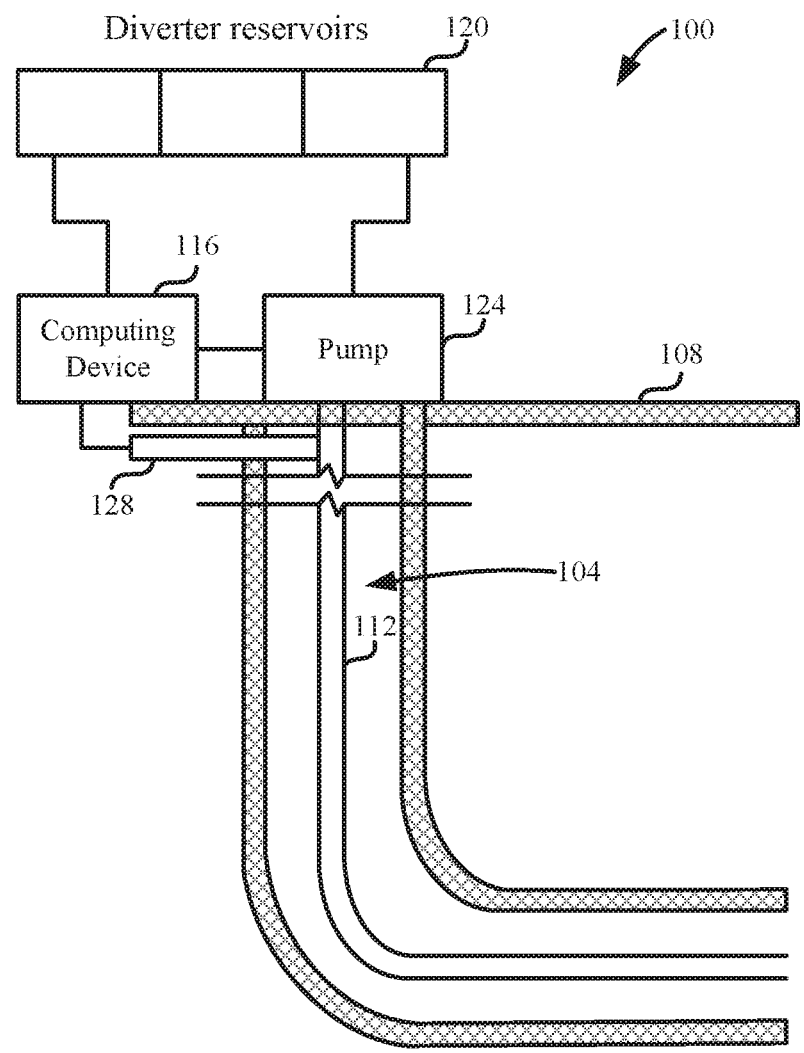
FIG. 1 is illustrates a cross-sectional view of a portion of a well environment that includes a system for placement of diverter in the wellbore according to some aspects of the disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only, and is not intended to limit the scope, applicability or configuration of the disclosure. Rather, the ensuing description will provide those skilled in the art with an enabling description for implementing the inventive concepts described herein. It is understood that various changes may be made in the function and arrangement of elements without departing from the spirit and scope as set forth in the appended claims. Further, it should be appreciated that as used herein, the term "or" may be inclusive or exclusive.

Certain aspects and features relate to systems and methods that use pressure measurements to control the injection of diverter into a wellbore to induce complexity from far-field to near wellbore. Injecting diverter induces bridging (or plugging) at a particular location within a formation. Based on pressure measurements, onset of pressure response (OPR) values, OPR waveforms, or combinations thereof, diverters of a particular matter size distribution (e.g. a can be pumped into the wellbore to cause bridging at a precise location in the formation. As used herein the term "OPR" may refer to a discrete value, a set of values, a waveform, or combinations thereof that are generated from a set of OPR values over time. The bridging (or plugging) may add complexity in the formation proximate to the location of the bridging. Diverter stages, each including different matter size distributions, can be scheduled (with pad, proppant, fluid, other materials, or a combination of materials stages) to systematically generate complexity from far-field to near wellbore.

OPR can guide the selection of subsequent diverters (e.g., in real-time) during execution of a diverter schedule. For example, a high OPR, can indicate bridging has occurred further field from the wellbore, while a low OPR can indicate bridging has occurred closer to the wellbore. In some instances, OPR may be calculated after each diverter is dropped into the wellbore and compared to previously calculated OPR, threshold OPR associated with each scheduled diverter, or combinations thereof. The OPR may be used to target bridging and add complexity throughout the formation by generating a schedule that targets far-field locations within the formation (e.g., with a diverter including a small matter size distribution) and targeting successively closer locations (to the wellbore) within the formation (e.g., with diverters that include successively larger matter size distributions).

The OPR may also be used to dynamically control the execution of the diverter schedule. For example, a lower than expected OPR may indicate that bridging (and by extension complexity) has occurred closer to the wellbore than anticipated. Rather than pump the next scheduled diverter which, due to the unanticipated low OPR, may not add optimal complexity, the systems and methods herein may provide for dynamically overriding the diverter schedule selecting a different diverter that that will add the optimal complexity. A new diverter may be defined in real-time or another diverter in the diverter schedule may be pumped into the wellbore in place of the next scheduled diverter. Thus, the diverter schedule can be executed to systemically add complexity in a formation while accounting for unanticipated situations.

The systems and methods include defining a diverter schedule to induce an intended complexity. The diverter schedule may include a set of diverters each of which including a particular matter size distribution. The diverter schedule may order the diverters such that diverters with smaller matter size distributions (e.g., a distribution of smaller matter) are injected before diverters with larger matter size distributions (e.g., a distribution of larger matter). After pumping a first diverter into wellbore, pressure measurements can be used to calculate OPR value(s) or an OPR waveform that can indicate an amount of time from pumping the diverter into the wellbore to detecting a threshold increase in pressure. The OPR can be defined as the time delay or the displacement volume required to see a first pressure signal (i.e., increase in pressure since the diverter hit downhole). The OPR can be used, for example, to determine if the diverter was successful (in creating a target level of diversion or complexity) or to determine a next diverter to be pumped into the wellbore. After the next diverter is pumped into the wellbore, the systems and methods may determine whether there are other diverters scheduled, if a target measure of complexity has been created, or if the diverter schedule has completed.

FIG. 1 is a cross-sectional view of an example of a well system 100 including a wellbore 104 in a formation 108. A tubing string 112 is deployed in wellbore 104 and can be used to pump fluid, proppant, pad, diverter, other material, or a combination of materials into the wellbore. The diverter material can be any material used to ensure that fluid, proppant, pad, diverter, other materials, or a combination of materials pumped into the wellbore can be directed in particular directions or orientations. In some instances, the diverter may be a biodegradable polymer. The diverter can be formed into a particulate with variable sizes and shapes of matter that selected by a user, operator, or a computing device (e.g., such as computing device 116). In some instances, the diverter includes matter of a single size. The diverter can include a distribution of matter of various sizes. The "size" of the diverter may be based on the relative sizes of the matter size distribution such as the percentage of each matter size included in the diverter. For example, a diverter may have a matter size distribution that is made up of 70% of 100 mesh matter and 30% of 60 mesh matter.

As used herein, the term "mesh" is used as a unit of measurement that indicates a matter (e.g., particle, fiber, combinations thereof, etc.) that is at least smaller than the holes of a mesh of a given standard size (e.g., material that falls through the holes of the mesh when the material is sifted over the mesh is considered to be that mesh's size). In some instances, a material that has passed through a mesh of a particular size (e.g., 60 mesh) is considered to correspond to that mesh value despite being made up of a matter of various sizes (e.g., each being at least smaller than the holes of the mesh). Particles, fibers, or any other material used as a diverter may be of any particular shape provided it conforms to a size designated in mesh units. In addition, "matter size distribution" refers to a set of materials (e.g., particle, fiber, etc.) included in a diverter where each material of the set of materials may be of a particular mesh size (and not necessarily the same mesh size as other materials of the set of materials).

The computing device 116 can dynamically formulate a diverter of an optimal matter size distribution by accessing diverter reservoirs 120. Computing device 116 may use sensor or other data (such as, but not limited to data obtained from similar formation types or previous fluid, pad, proppant, or diverter injections into the wellbore) to select or modify the particle sizes of the diverter in real-time. For example, a first diverter injected into well system 100 may include particles of 100 mesh and 60 mesh (in a distribution of 70% and 30% respectively), while a second diverter injected into well system 100 may include particles of 100 mesh, 60 mesh, and 30 mesh (in a distribution of 50%, 40%, and 10% respectively).

Computing device 116 can operate pump 124 to pump fluid, proppant, pad, diverter, or other materials into wellbore 104. In some instances, pumping diverter into a wellbore can be referred to as a diverter drop. Computing device 116 may receive and store data from one or more sensors (such as pressure sensor 128). In some instances, pressure values received from pressure sensor 128 may be aggregated over time to generate a measurement of an onset of pressure response, which can be used to determine the effect of a diverter drop on the wellbore and the surrounding environment.

Figure 2:
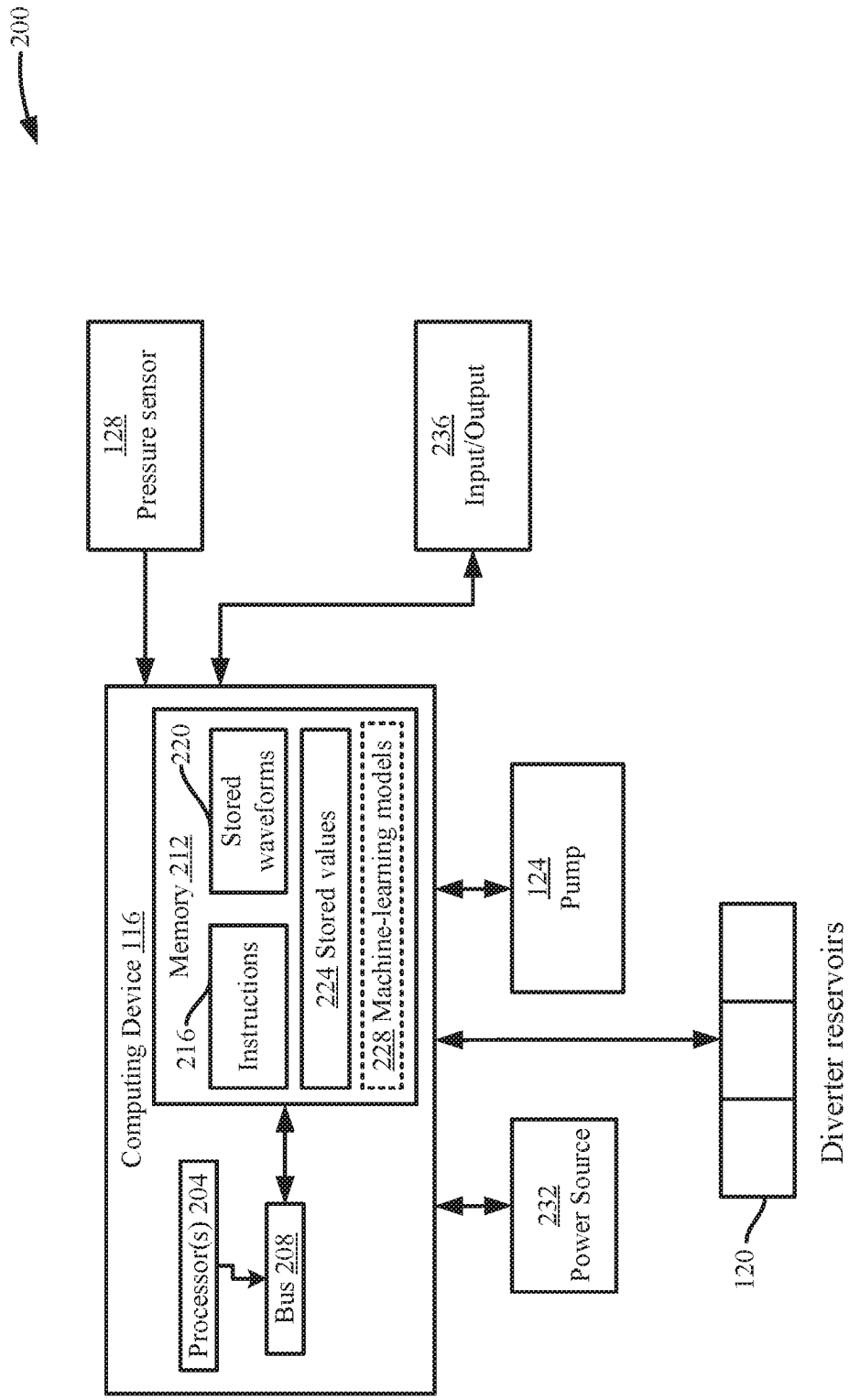
FIG. 2 depicts a block diagram of a system for providing diverter diagnostics and matter size distribution selection according to some aspects of the disclosure.

FIG. 2 is a block diagram of a system 200 for controlling the operations of well systems (e.g., such as well system 100 of FIG. 1), diverter diagnostics, and matter size distribution selection according to some aspects of the disclosure. System 200 includes a computing device 116 (e.g., the same computing device depicted in FIG. 1 or another computing device). Computing device 116 includes one or more processors 204 and a bus 208 connecting the one or more processors 204 to memory 212. The one or more processors 204 can execute one or more operations for obtaining pressure measurements from pressure sensor 128, calculating OPR from aggregated pressure measurements, generating waveforms from the pressure measurements, controlling pump 124, receiving input or generating output through interface 236, combinations thereof, or the like. Pressure measurements, calculated OPRs, waveforms, and the like can be stored in memory 212. The one or more processor 204 can execute instructions 216 stored in the memory 212 to perform one or more of the aforementioned operations. Alternatively or additionally, the one or more processors 204 can execute instructions received from input/output interface 236 (e.g., through a wired or wireless connection with another computing device in proximity or through a network such as the Internet) to perform one or more of the aforementioned operations.

In some instances, executing one or more of instructions 216 can execute operations for receiving and decoding measurements from one or more sensors (e.g., stored in stored values 224), calculating OPRs, measuring waveforms 220, measuring a level of success for each diverter drop, determining a type of bridging occurring in the formation, determining an optimal matter size distribution for each diverter to be pumped into the wellbore in real time, defining a diverter schedule, or the like. In some instances, one or more of the operations may use data stored in stored values 224 for thresholds, targets, indexes, particle sizes, combinations thereof, or the like. Operations may optionally use a machine-learning model 414 to define and manage a diverter schedule, other operations of the well system, determine successful diversion (e.g., based on a calculated diversion index), combinations thereof, or the like. The machine-learning model may be trained using fabricated data or data from previous instances of pumping diverters into wellbores of various formation types. In some instances, once trained, the machine-learning model may be used to determine an order of operations for the wellbore (e.g., when and in what order to pump materials into the wellbore), a quantity of diverter drops, particle distributions for each diverter drop, etc. for a particular formation.

Computing device 116 may incorporate one or more sensors(e.g., accelerometers, gyroscopes, pressure sensors, etc.) 128 or be wired or wirelessly connected to one or more sensors 128, diverter reservoirs 120, a power source 232, an input/output interface 236, and one or more pumps 124. In some instances system 200 may operate or otherwise control the operations of one or a plurality of well systems (e.g., such as well system 100). Input/output interface 236 may include human-machine interfaces (e.g., connecting keyboard, pointing device, display, touch based interfaces, combinations thereof, or the like), other computing devices (e.g., local or remote devices via wired or wireless network connections), other input/output devices, combinations thereof, or the like. For example, indications of a type of bridging detected, diversion success, waveforms, or other data related to the operation of the system may be displayed via a display that is connected to or is part of input/output interface 236. An operator may provide input using input/output interface 236 to configure or control the operations of computing device 116 or one or more well systems.

Computing device 116 and system 200 may each or both be powered via a power source 232. The power source 232 can be in electrical communication with the computing device 116. In some instances, power source 232 can include a battery or an electrical cable (e.g., a wireline). In some instances, the power source 232 can include an AC signal generator.

Figure 3:
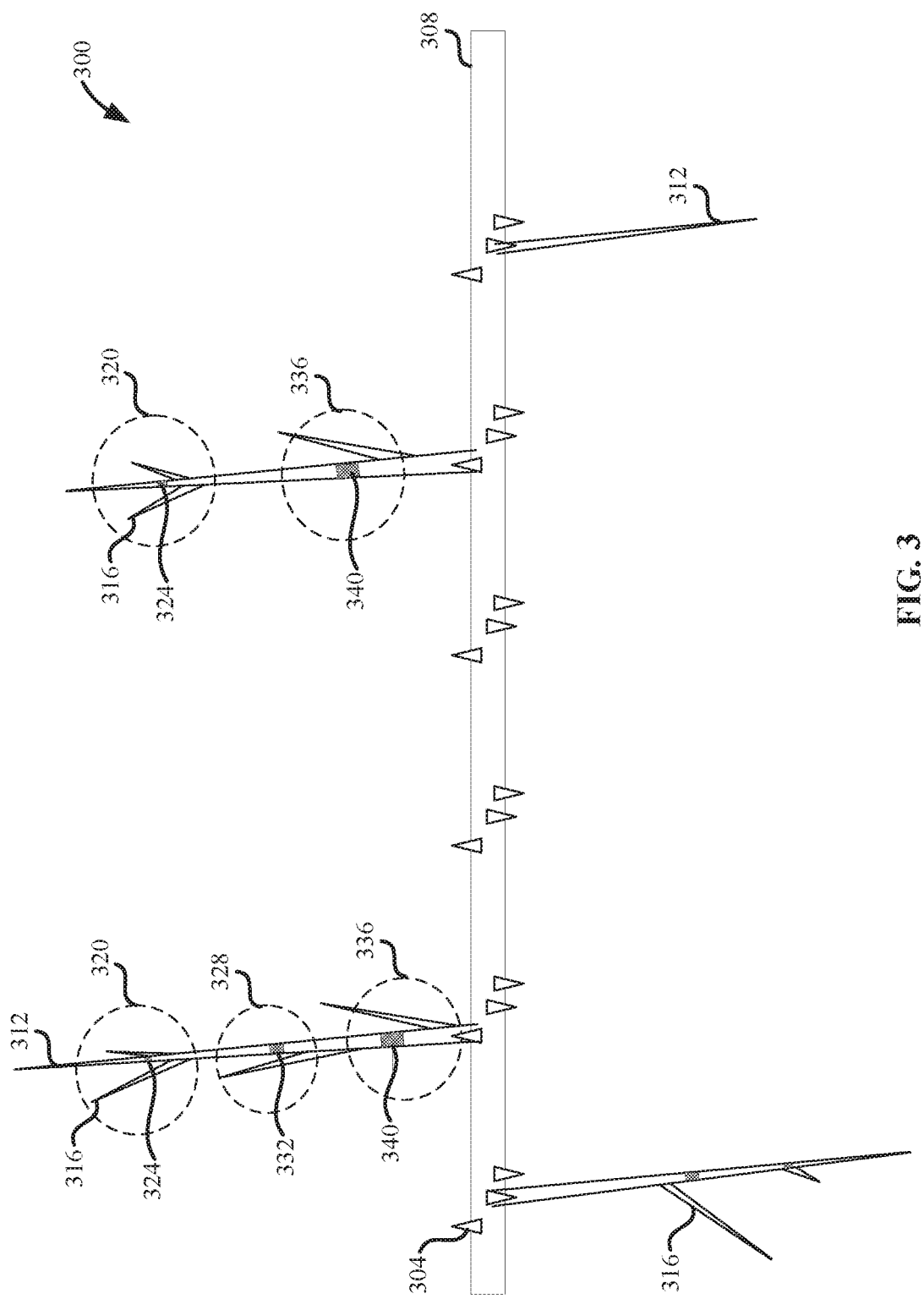
FIG. 3 depicts an expanded view of a portion of the downhole environment of the wellbore of FIG. 1 according to some aspects of the disclosure.

FIG. 3 depicts an expanded view of a portion of the downhole environment of the wellbore of FIG. 1 according to some aspects of the disclosure. The wellbore 304 includes a plurality of perforation clusters 308 which enables material pumped into the wellbore to exit the wellbore and exert pressure on the environment. The pressure causes fractures 312 to form in the environment from which to extract hydrocarbons. Increasing the complexity of each fracture increases the volume and rate in which hydrocarbons can be extracted.

Complexity in a facture (e.g., 312) can include the generation of secondary (tertiary, etc.), sometimes smaller, fractures (e.g., 316), that are formed tangent/branching from the primary fracture 312. Complexity can be generated by creating a bridge, plug, or both at a particular location within facture 312 using diverter. The diverter displaces or diverts material that may be pumped through the wellbore causing the addition of complexity in the formation. The location of the bridging can be targeted by controlling the matter size distribution of the diverter. Smaller matter size distributions create bridging further/farther from the wellbore (e.g., far-field), while larger sized particles create bridging closer to the wellbore. For example, far-field complexity 320 can be generated by injecting diverter of a relatively small matter size distribution creating far-field bridging 324. Mid-field complexity 328 may be generated using larger particles to create mid-field bridging 332. Near-wellbore complexity 336 can be generating using diverter that includes larger particles than those used to generate the mid-field complexity. The diverter creates a larger bridging effect 340 that is closer to wellbore.

While only three diverter stages are described, it should be appreciated that any number of diverters can be pumped into a formation to induce complexity without departing from the spirit or scope of the present disclosure. Any number of diverters can be included in a diverter schedule to granularly generate complexity from far-field to near wellbore. The number of diverters scheduled to be pumped into a formation may be determine in real-time during operation of a well system, by an operator of the well system, based on a machine-learning model, a intended minimum level of complexity, combinations thereof, or the like.

Figure 4A:
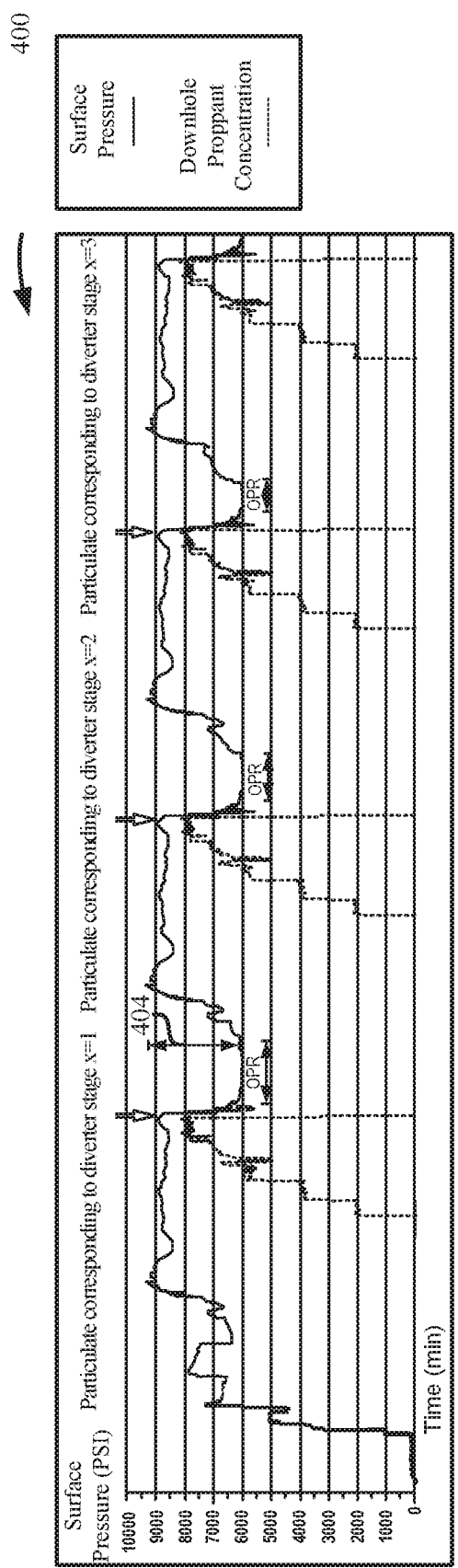
FIGS. 4A and 4B depict a waveforms of measurements obtained from the downhole environment in response to the injection of fluid or diverter according aspects of the present disclosure.

FIG. 4A depicts an OPR waveform (e.g., solid line) generated by measuring pressure in the downhole environment in response to the injection of fluid or diverter according aspects of the present disclosure. FIG. 4A also depicts downhole proppant concentration in lb/gal (e.g., dotted line). In some instances, the downhole proppant concentration waveform may include a maximum value (e.g., 5 as depicted in FIG. 4A) such as the actual maximum measured or a selected maximum (where data that exceeds the selected maximum is omitted from the waveform). Any such maximum may be selected to provide a data resolution sufficient to identify the state of the downhole environment. The onset of pressure response may be determined as an amount of time between pumping a material (e.g., diverter) into the wellbore downhole and a detected increase in pressure. The detected increase may be a percentage increase (e.g., an increase of 5% of expected pressure measurements), a value increase (e.g., pressure increase by 100), a threshold increase (e.g., pressure exceeds 6100), or the like. The calculated OPR associated with stage x=1 corresponds with the complexity generated in FIG. 3 at 320. Since the overall matter size distribution is small and bridging is intended to be created far-field the OPR may be relatively high. The calculated OPR associated with stage x=2 and x=3 may be relatively smaller than stage x=1 due to the overall larger matter size distributions and the closer (to the wellbore) bridging. The OPR can be used to determine the success of diverter in generating complexity in an intended location. Success of each diverter stage may also be determined by the magnitude of pressure of the OPR waveform 404. In general, bridging/plugging closer to the wellbore would result in larger magnitude of the pressure rise and vice versa.

Figure 4B:
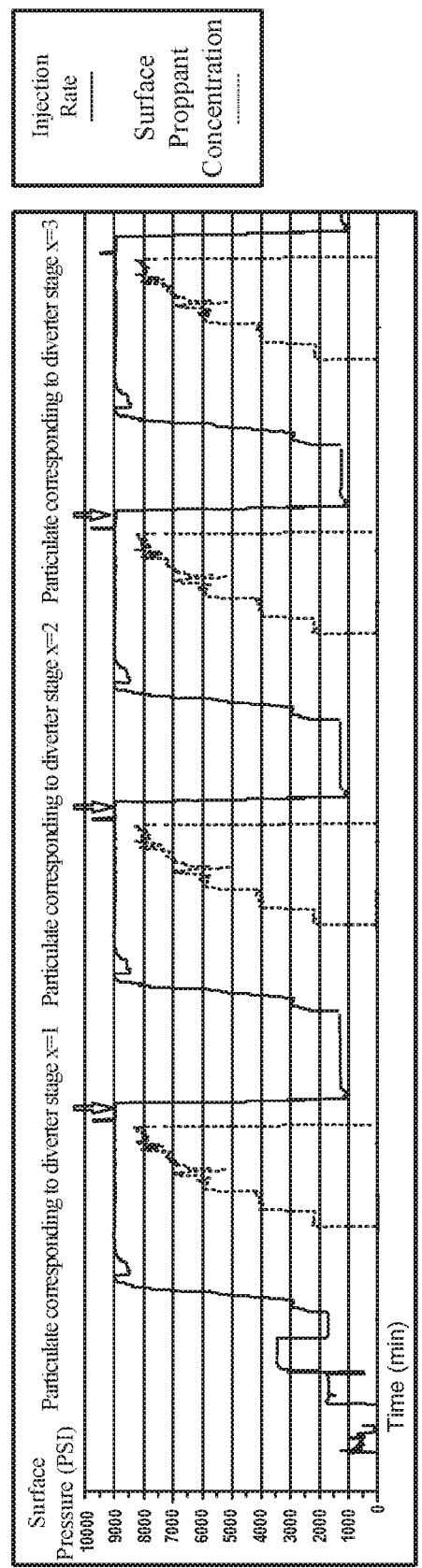

FIG. 4B depicts two waveforms, the first represented by the solid line, represents an injection rate (e.g., of the diverter, fluid, proppant, other material, or combinations thereof) with a maximum value (not maximum scale) (such as 80 BPM from zero as depicted in the FIG. 4B). Any such maximum (or range) may be selected to provide a data resolution sufficient to identify the state of the downhole environment as a result of matter being pumped into the wellbore or as a result of measuring the injection rate. For example, the maximum injection rate measured or a selected maximum such that the data above the maximum may be omitted from the waveform may be used. The second waveform (represented by the dotted line) represents the surface proppant concentration in lb/gal. In some instances, the surface proppant concentration waveform may include a maximum value (e.g., 5 as depicted in FIG. 4B) such as the actual maximum measured or a selected maximum (where data that exceeds the selected maximum is omitted from the waveform). Any such maximum may be selected to provide a data resolution sufficient to identify the state of the downhole environment.

Figure 5:
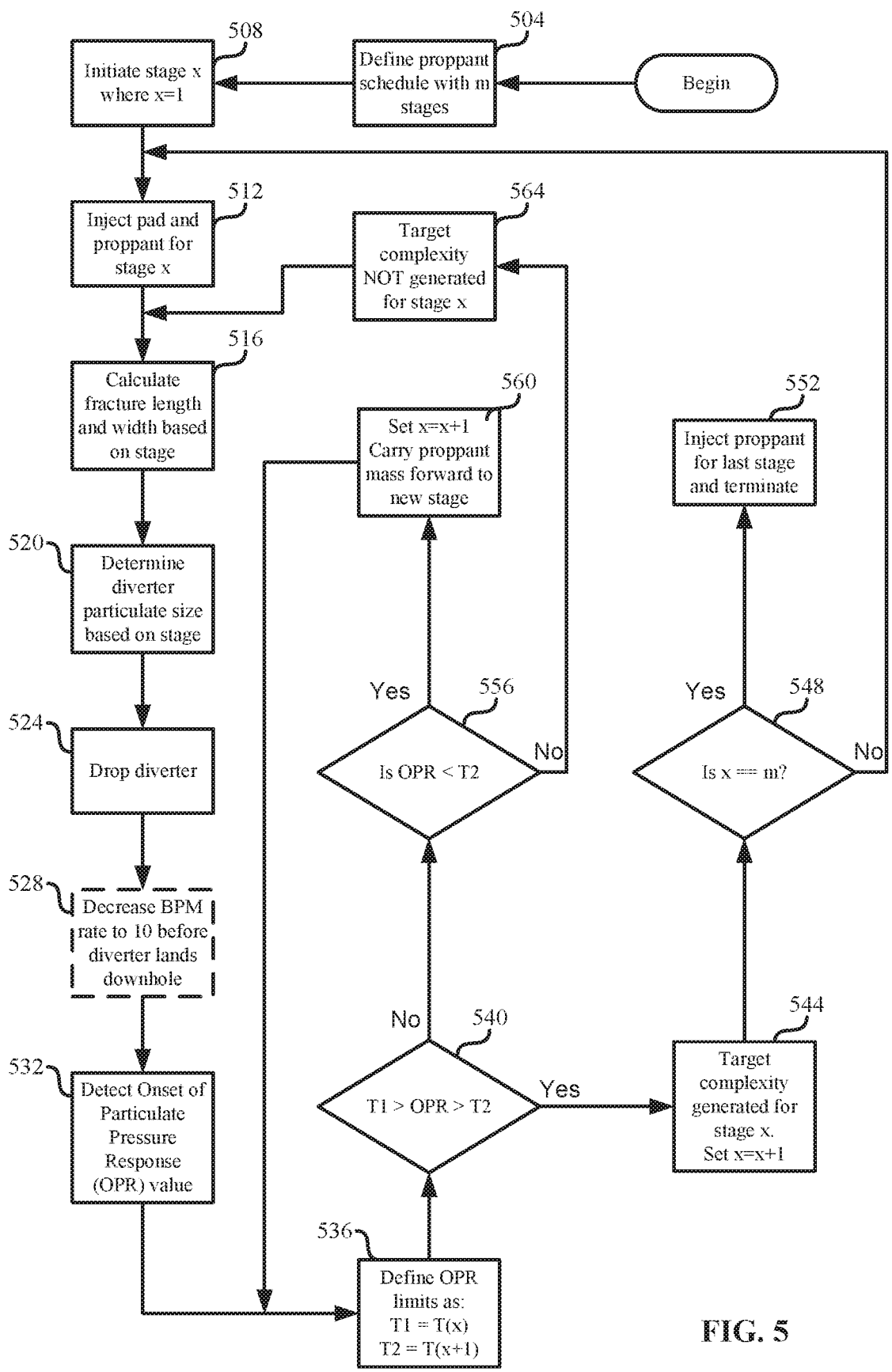
FIG. 5 illustrates a flowchart of a process for providing a diverter schedule that increases complexity in subterranean fractures according aspects of the present disclosure.
Figure 7:
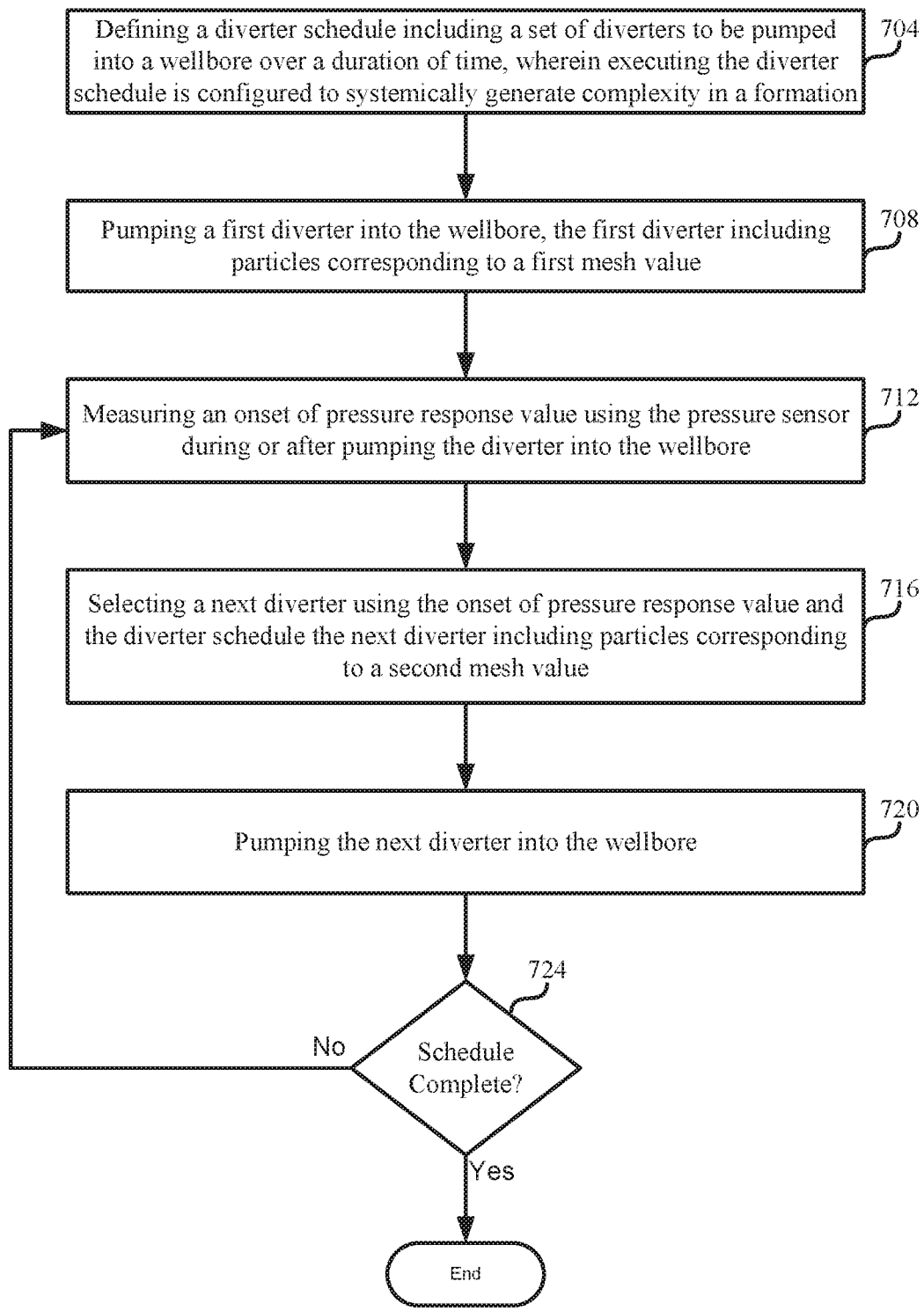
FIG. 7 illustrates a flowchart of a process for providing a diverter schedule that increases complexity in subterranean fractures according aspects of the present disclosure.

FIG. 5 illustrates a flowchart of a process for providing an diverter schedule that increases complexity in subterranean fractures according aspects of the present disclosure. The process begins at block 504 in which a diverter schedule is defined. The diverter schedule may include one or more stages in which each stage includes pumping diverter (and optionally, fluid, proppant, pad, other material, or a combination of materials) into a wellbore. The schedule may be defined by an operator of a computing system (e.g., computing system 116 of FIG. 1 or FIG. 2) or automatically based on formation type, a particular intended complexity, data from previous stages (e.g., using a machine-learning model, etc.), combinations thereof, or the like. The schedule may indicate a total number of diverter stages ('m') and for each diverter stage ('x'): a material (e.g., fluid, proppant (m+1 total proppantstages/cycles), pad, diverter, other material, or a combination of materials) to be injected into the wellbore, a matter size distribution or volume of material to be injected, a range of OPR for the material to be injected, combinations thereof, the like.

At block 508, a first stage can be executed by the computing device. The first stage 'x' of 'm' stages is initiated, where 'x' is initially equal to one.

At block 512, the first stage initiates by injecting one or more of a fluid, pad, proppant, other material, or a combination of materials into the wellbore. The mass of a material, proppant for example, that may be injected for any given stage may be determined by $$\frac{P_{total}}{\text{Total proppant cycle}}.$$

where $P_{total}$ is the total mass of the proppant to be injected during the entire diverter schedule. According to the equation, the mass of proppant that may be injected into the wellbore does not substantially change from pumping stage to stage. In some instances, the mass of the proppant in subsequent stages may be greater than or less than the mass of the proppant injected during the previous stage. In other instances, the proppant mass for a given stage may be determined by one or more sensors, one or more values calculated during the current or previous stage, an operator, etc.

At block 516, a fracture length or width can be calculated by the computing device based on the material (e.g., pad, proppant, fluid, diverter, other material, or a combination of materials) injected into the wellbore. The length or width may be used to determine a distance along the fracture length in which to generate complexity. For example, the distance may be calculated by, for example, $$\frac{\text{Fracture Length}}{m}.$$

In some instances, complexity may be generated in more than one distance along a fracture length. In those examples, the distance may be determined by, for example, $$\frac{\text{Fracture Length}}{x}.$$

At block 520, a matter size distribution for a diverter to be injected into the wellbore is selected. The matter size distribution may be selected based on a pressure measurement, OPR, a schedule (e.g., use a particular matter size distribution for a particular stage), by a user or operator, a machine-learning model such as a machine learning model 228, an intended complexity to be generated, combinations thereof, or the like. Each scheduled diverter may include particles of one size or multiple set sizes. Each scheduled diverter may include the same matter size distribution, different matter size distribution, same mass (e.g., combined mass of each matter size included in the diverter), or a different mass from other scheduled diverters.

The diverter schedule may include a particular order in which each diverter is to be dropped into the wellbore. The diverter schedule may schedule the diverters from smallest matter size distribution (to be dropped first) progressing to the largest matter size distribution (to be dropped last). For example, a first diverter may include 70% of a 100 mesh and 30% of a 60 mesh where as a second diverter may include larger particles such as 50% 100 mesh, 40% 60 mesh, and 10% 30 mesh. An example of a possible diverter schedule with a set of diverters with varying matter size distributions is illustrated and described in connection to FIG. 6.

FIG. 6 depicts a diverter schedule 600 including five diverter stages (x=1 through x=5) that include five matter size distributions (e.g., the percentage of each particle size included in a particular diverter drop for a particular stage). The five diverter stages are ordered such that the smallest particles (e.g., 100 mesh and 60 mesh) are scheduled to drop before larger particles (e.g., 30 mesh and 8 mesh) in order to illustrate a diverter schedule that can generate complexity from far-field to near wellbore. Though five diverters are described corresponding to five matter size distributions any number of diverters may be defined according to any corresponding number of matter size distributions without departing from the spirit or the scope of the present disclosure. FIG. 6 is intended to illustrate a possible diverter schedule including a set of diverters and their relative matter size distributions.

Diverter drops may be scheduled according to the relative size distributions of each diverter to be injected. A matter size distribution may be expressed as a percentage matter of the diverter that corresponds to each mesh size or an average of the mesh sizes (e.g., using the percentage each mesh included as a weight) of a diverter. For example, complexity in the formation (e.g., from far-field to wellbore) may be increased by defining a schedule of diverter drops that have matter size distributions that increase with each successive diverter drop. In some instances, a diverter schedule may schedule diverters of any particular matter size distribution provided that each subsequent diverter in the diverter schedule includes a matter size distribution that is larger (i.e., the particles corresponding lower meshes) than the previous diverters in the diverter schedule. Each scheduled diverter may include the same quantity of sizes (e.g., two mesh sizes) or varying quantity of mesh sizes (e.g., a first diverter including matter corresponding to 100 mesh an 60 mesh and a second diverter including matter corresponding to 100 mesh, 60 mesh, and 30 mesh) in addition to differing matter size distributions.

In some instances, a diverter schedule may include diverters of any particular matter size distributions provided that each subsequent diverter in the diverter schedule includes a matter size distribution that is smaller (i.e., the particles corresponding larger meshes) than the previous diverters in the diverter schedule. In still yet other instances, each diverter included in a diverter schedule may have a particular matter size distribution set by a machine-learning model, operator, or the like. Each diverter in this diverter schedule may be smaller, larger, or the same as other diverters in the diverter schedule. The order of this diverter schedule may be determined dynamically (e.g., when the schedule is executed based on sensor measurements, such as the pressure sensor, an onset of pressure response, a machine-learning model, an operator, combinations thereof, or the like), or predetermined.

Each diverter in the diverter schedule may include approximately the same mass (e.g., the mass of the matter to be injected stays constant while the relative size of the matter increases with each diverter) determined by one or more sensors, an operator, a machine-learning model, previous diverters injected into the wellbore, combinations thereof, and the like. In other instances, the mass of each diverter may decrease with each successive diverter or increase with each successive diverter. In still yet other instances, the mass of each diverter may vary (e.g., be larger, smaller, or approximately the same as other scheduled diverters). In instances in which the mass of each diverter differs (e.g., the increasing, decreasing, or varying scenarios), the mass of any particular diverter may be determined dynamically (e.g., at runtime prior to injection) by one or more sensors, an operator, a machine-learning model, previous diverters injected into the wellbore, combinations thereof, and the like.

Returning to FIG. 5, at block 524, the scheduled diverter (i.e., the diverter including the matter size distribution selected in block 520) is injected into the wellbore, for example, by pump 124. At block 528, the injection rate (e.g., barrels per minutes or BPM) can be optionally reduced just before the selected diverter is reaches downhole of the well system. Decreasing the injection rate may improve the pressure measurements (ensuring the pressure readings are due to the material already injected into the wellbore rather than the act of injecting the material into the wellbore). In some instances, the injection rate may be reduced to a predetermined amount (e.g., 10 to 40 BPM) based on the sensitivity or sampling rate of the sensors.

At block 532, one or more pressure sensors (e.g., pressure sensor 128 of FIG. 1 or FIG. 2) may be used to measure pressure in the wellbore and to calculate the OPR as a result of the diverter drop. Pressure measurements may be obtained continuously (e.g., in real-time), continuously over one or more predetermined time intervals, in set intervals (e.g., a set or variable sampling rate), upon a predetermined event (e.g., when a material is injected into the wellbore), upon operator direction, or combinations thereof.

The onset of pressure response indicates an amount of time from material being injected into the wellbore downhole and a threshold measurement of pressure being detected by the pressure sensor. Alternatively, an OPR can also be converted into volumetric units e.g. displacement volume (OPR×Slurry rate) in gallons required to see threshold measurement of pressure being detected by the pressure sensor. OPR can be used to generate targeted complexity from far-field to near wellbore by creating bridging in particular locations of the formation. For example, a diverter including a small particular distribution (e.g., greater than 60 mesh) can generate far-field bridging inducing far-field complexity. A first OPR can be calculated after this diverter drop (and optionally compared to an earlier OPR) to confirm that far-field bridging has occurred. A subsequent diverter may include a larger matter size distribution (e.g., greater than 30 mesh) to generate mid-field bridging (e.g., closer to the wellbore). A second OPR can be calculated (and optionally compared to the first OPR) to confirm that mid-field bridging has occurred. The second OPR, due to the mid-field bridging, may be smaller than the first OPR (due to the mid-field bridging reducing the volume in the formation). The calculated OPR may be further used to determine a matter size distribution to include in subsequent diverter drops (e.g., in conjunction with or to deviate from the diverter schedule).

At block 536, a first OPR threshold (T1) and a second OPR (T2) threshold can be determined for the diverter that was just injected into the wellbore. Each scheduled diverter may include a corresponding OPR threshold (e.g., T(x)). The first OPR threshold may be set to the OPR threshold associated with the diverter that was just injected into the wellbore. The second OPR threshold may be set to the OPR threshold of the diverter that is scheduled for injection next (e.g., T(x+1)). In other instances, the second OPR threshold may be set to the OPR threshold associated with the diverter that was just injected into the wellbore and the first OPR threshold may be set to the OPR threshold of the diverter that is scheduled for injection next (e.g., T(x+1)). In still yet other instances, the first and second OPR thresholds may be predetermined, dynamically set (e.g., by a machine-learning model 228, sensor measurements, etc.), set by an operator, combinations therefor, or the like.

At block 540, the calculated OPR from block 532 is compared to the first and second OPR thresholds. If the calculated OPR is between the first and second OPR thresholds, control passes to block 544; otherwise, if the calculated OPR is not between the first and second OPR thresholds, control pass to 556.

At block 544, it is determined that target complexity has been achieved (for the particular stage) based on the calculated OPR being between the first and second OPR thresholds. The current stage (e.g., x) is incremented (e.g., x=x+1). At block 548, it is determined whether 'x' is equal to 'm' (i.e., whether the incremented stage is now equal to the total number of stages in the diverter schedule). If 'x' is equal to 'm', then the process continues to block 552 in which the diverter schedule has completed (e.g., all stages have been executed) and the process terminates. In some instances, a last mass of proppant is pumped into the wellbore before the process terminates. Otherwise, if 'x' is not equal to 'm', then control returns to block 512 in which the incremented stage initiates.

At block 556 (reached when the calculated OPR is not between the first and second OPR thresholds), it is determined whether the calculated OPR is less than the second OPR threshold (T2). If the calculated OPR is less than the second OPR threshold, then control passes to block 560, otherwise, control passes to 564.

At block 560, the stage is incremented (e.g., x=x+1) and the mass of the proppant is carried forward to the incremented stage. Control returns to block 536 where a new first and second OPR threshold is calculated by the computing device based on the incremented stage (e.g., using the OPR threshold associated with the incremented stage and subsequent stage to the incremented stage). This occurs when the OPR indicates bridging (if occurring at all) is occurring closer to the wellbore than expected. Blocks 556-560 cause the next scheduled diverter (e.g., x+1) to be skipped. In instances in which the diverter schedule includes diverters with an increasing matter size distribution, skipping a diverter causes the next diverter to be injected to include a substantially larger matter size distribution. The larger matter size distribution can induce bridging closer to the wellbore (and enable generating complexity closer to the wellbore as well). In some instances, rather than skipping a diverter, a new diverter may be defined, the next scheduled diverter may be modified, or the like using, as examples, a machine-learning model 228, operator input via I/O interface 236, or the like. Blocks 536-540 and 556-650 may be repeated effectively skipping one or more scheduled diverters such that the next diverter, if any, pumped into the wellbore adds optimal complexity in an intended location within the formation.

At block 564 (reached when the calculated OPR is greater than the second OPR threshold), it is determined that target complexity has not been generated for the particular stage. The current stage 'x' is repeated doubling the amount of diverter for stage 'x' and control returns to block 512 in which the incremented stage initiates.

FIG. 6 illustrates a flowchart of a process for providing a diverter schedule that increases complexity in subterranean fractures according aspects of the present disclosure. The process increases complexity by devising and deploying a schedule of diverter drops with particular matter size distributions that vary with each diverter drop.

At block 704, a diverter schedule including a set of diverters to be pumped into a wellbore over a duration of time is defined. The diverter schedule may be defined to generate a particular quantifiable measure of complexity in a formation (e.g., a subterranean fracture) or to excise a particular quantity of hydrocarbons. The diverter schedule may include a set of diverters to be pumped into a wellbore. While the set of diverters may include one or more diverters, the schedule may pump each diverter of the set of diverters scheduled or a subset of the set of diverters that are scheduled based the execution of the diverter schedule. Each stage of the diverter schedule can be associated with a particular onset of pressure response that may be used as a threshold to determine a level of success in generating a target level of complexity for that diverter or to select a next diverter stage.

At block 708, a first diverter stage (e.g., selected using the diverter schedule) is pumped into the wellbore. The first diverter includes one or more particles of one or more particle sizes (e.g., measured in mesh units). The matter size distribution of each mesh may be determined by a percentage of each particle size represented. For example, a diverter may have particle sizes that are 100 mesh and 60 mesh and the matter size distribution can indicate the relative percentage of each particle size (e.g., 70% 100 mesh and 30% 60 mesh) represented in the matter size distribution.

At block 712, one or more pressure measurements may be obtained to calculate an onset of pressure response (OPR) from pumping the selected diverter into the wellbore. The OPR may be calculated during or after pumping the selected diverter into the wellbore. In some instances, an OPR waveform (e.g., such as that depicted in FIG. 4) may be generated instead of a discrete OPR value.

At block 716, a next diverter is selected using the diverter schedule and the calculated OPR. The next diverter may be the next scheduled diverter (e.g., the second diverter) or the system may select a different diverter to be pumped into the wellbore out-of-order from the diverter schedule. For example, in some instances, the diverter schedule may be executed in order such that each diverter is pumped into the wellbore in the prescribed order without deviation. In other instances, the calculated OPR may be used to skip the next scheduled diverter by selecting a diverter from the diverter schedule that can add an optimal measure of complexity. For example, based on the formation and OPR, a diverter of a particular matter size distribution may be dynamically selected to add complexity in a particular location within the formation. The selected diverter may be the next diverter in the diverter schedule (e.g., in-order), another diverter in the diverter schedule, (e.g., out-of-order), a newly defined diverter, a modified scheduled diverter, or the like.

Complexity can be generated using diverter to create bridging within a formation that can create additional secondary fractures tangent to the formation and located proximate to the bridging (e.g., see FIG. 4). The matter size distribution of a diverter can be used to target the location of bridging within the formation. A small matter size distribution, for example, may generate bridging far-field from the wellbore, while a larger matter size distribution can generate bridging closer to the wellbore. Each diverter selected to be pumped into the wellbore may be selected to generate bridging (and thus complexity) at specific locations within the formation to increase the complexity generated. In some instances, generating near-wellbore complexity may reduce the efficacy bridging to create far-field complexity. In those instances, the generation of systemic complexity (e.g., far-field to near wellbore) may be improved by generating the complexity from far-field first moving towards the wellbore.

Systemic complexity (e.g., from far-field to near wellbore) can be generated by pumping diverter with successively larger matter size distributions. In other instances, complexity may be generated by pumping diverter with successively smaller matter size distributions, the same size matter size distributions, or of varying matter size distributions (e.g., each successive diverter may include smaller, larger, or the same matter size distribution as the previous diverter pumped into the wellbore that is, for example, selected based on the OPR calculated as a result of the previous diverter).

At block 720, the selected next diverter is pumped into the wellbore.

At block 724, it is determined if the schedule is complete. In some instances, the schedule is complete when each diverter (except for skipped diverters) are pumped into the wellbore. In other instances, the schedule is complete when a target complexity is generated, a calculated OPR exceeds a threshold, based on data from one or more sensors such as pressure sensor 128, upon input received by an operator such as through I/O interface 236, or the like. If the diverter schedule is not complete, the process returns to block 712 in which a new OPR (or waveform) is calculated based on pumping the next diverter into the wellbore. The new OPR can be used to select a new diverter from the set of diverters to pump into the wellbore. If the schedule is complete, on the other hand, the process terminates. Although the process was described with respect to blocks 704-724 in particular order, it should be appreciated that each block may be executed in-order, or out-of-order, or repeated (in addition to blocks 712-724 being repeated as described above). Further, it should be appreciated that blocks 712-724 may be repeated one or more times, indefinitely, until a threshold is reached (e.g., based on calculated OPR, intended complexity being added, sensor measurements, etc.), operator input, combinations thereof, or the like).

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, or any combination thereof. When implemented in software, firmware, middleware, scripting language, microcode, or combinations thereof, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, program statements, or combinations thereof. A code segment may be coupled to another code segment or a hardware circuit by passing or receiving information, data, arguments, parameters, memory contents, or combinations thereof. Information, arguments, parameters, data, etc. may be passed, forwarded, or transmitted via any suitable means including memory sharing, message passing, token passing, network transmission, etc.

For a implementations in firmware, software, or combinations thereof, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices, other machine readable mediums for storing information, or combinations thereof. The term "non-transitory computer-readable medium" includes, but is not limited to portable or fixed storage devices, optical storage devices, or various other storage mediums capable of storing that can persistently contain or carry instruction(s), data, or combinations thereof.

While the principles of the disclosure have been described above in connection with specific apparatuses and methods, it is to be clearly understood that this description is made only by way of example and not as limitation on the scope of the disclosure.

What is claimed is:

1. A system comprising:
   a pressure sensor;
   a processing device communicatively coupled to the pressure sensor; and
   a non-transitory computer-readable medium comprising instructions that when executed by the processing device, cause the processing device to perform operations including:
      defining a diverter schedule to systemically generate complexity in a formation, the diverter schedule including a set of diverters to be pumped into a wellbore over a duration of time;
      pumping a first diverter of the set of diverters into the wellbore, the first diverter including matter corresponding to one or more first mesh values;
      determining an onset of pressure response value using a measurement by the pressure sensor during or after pumping the first diverter into the wellbore;
      selecting a second diverter of the set of diverters using the onset of pressure response value and the diverter schedule, the second diverter including matter corresponding to one or more second mesh values; and
      pumping the second diverter into the wellbore,
   wherein the onset of pressure response value is defined as an amount of time between pumping a material into the wellbore and an increase in pressure detected by the pressure sensor.

2. The system of claim 1, wherein a mass of the first diverter of the set of diverters is approximately the same as a mass of the second diverter of the set of diverters, and wherein an average of the one or more second mesh values is less than an average of the one or more first mesh values.

3. The system of claim 1, wherein a mass of the first diverter of the set of diverters is different from a mass of the second diverter, and wherein an average of the one or more second mesh values is less than an average of the one or more first mesh values.

4. The system of claim 1, wherein selecting the second diverter of the set of diverters to be pumped into the wellbore comprises:
   estimating a fracture width or length after pumping the first diverter into the wellbore using the onset of pressure response value, wherein selecting the second diverter of the set of diverters to be pumped into the wellbore is based on the fracture width or length.

5. The system of claim 4, wherein the non-transitory computer-readable medium comprising instructions that when executed by the processing device, cause the processing device to perform operations including:
   determining, by dividing the fracture width or length by a quantity of diverter stages in the diverter schedule, a distance along the fracture length or width in which to generate complexity.

6. The system of claim 1, wherein selecting the second diverter of the set of diverters to be pumped into the wellbore comprises:
   identifying, using the diverter schedule, the second diverter of the set of diverters that is scheduled to be pumped into the wellbore after the first diverter;
   determining that the onset of pressure response value is less than a first onset of pressure response threshold value associated with the first diverter and greater than a second onset of pressure response threshold value associated with the second diverter; and
   selecting, based on determining that the onset of pressure response value is less than the first onset of pressure response threshold value associated with the first diverter and greater than the second onset of pressure response threshold value associated with the second diverter.

7. The system of claim 1, wherein selecting the second diverter of the set of diverters to be pumped into the wellbore comprises:
   identifying, using the diverter schedule, a proposed second diverter of the set of diverters that is scheduled to be pumped into the wellbore after the first diverter;
   determining that the onset of pressure response value is below a first onset of pressure response threshold value associated with the proposed second diverter; and selecting, from the set of diverters and based on determining that the onset of pressure response value is below the first onset of pressure response threshold value associated with the proposed second diverter, the second diverter to be pumped into the wellbore, the second diverter being associated with a second onset of pressure response threshold value that is exceeded by the onset of pressure response value.

8. The system of claim 1, further comprising:
determining a second onset of pressure response value using a measurement by the pressure sensor during or after pumping the next diverter into the wellbore;
selecting a third diverter using the second onset of pressure response value and the diverter schedule, the third diverter including matter corresponding to one or more third mesh values, an average of the one or more third mesh values being smaller than an average of the one or more first mesh values and an average of the one or more second mesh values; and
pumping the third diverter into the wellbore.

9. The system of claim 1, wherein the non-transitory computer-readable medium comprising instructions that when executed by the processing device, cause the processing device to perform operations including:
determining a mass of a proppant to pump into the wellbore before or after each diverter of the set of diverters scheduled to be pumped into the wellbore, wherein the mass of the proppant is determined, in part, by a quantity of diverter stages in the diverter schedule.

10. A computer-implemented method comprising:
defining a diverter schedule to systemically generate complexity in a formation, the diverter schedule including a set of diverters to be pumped into a wellbore over a duration of time;
pumping a first diverter of the set of diverters into the wellbore, the first diverter including matter corresponding to one or more first mesh values;
determining an onset of pressure response value using a measurement by a pressure sensor during or after pumping the first diverter into the wellbore, wherein the onset of pressure response value is defined as an amount of time between pumping a material into the wellbore and an increase in pressure detected by the pressure sensor;
selecting a second diverter of the set of diverters using the onset of pressure response value and the diverter schedule, the second diverter including matter corresponding to one or more second mesh values; and
pumping the second diverter into the wellbore.

11. The computer-implemented method of claim 10, wherein a mass of the first diverter of the set of diverters is approximately the same as a mass of the second diverter, and wherein an average of the one or more second mesh values is less than an average of the one or more first mesh values.

12. The computer-implemented method of claim 10, wherein a mass of the first diverter of the set of diverters is different from a mass of the second diverter, and wherein an average of the one or more second mesh values is less than an average of the one or more first mesh values.

13. The computer-implemented method of claim 10, wherein selecting the second diverter of the set of diverters to be pumped into the wellbore comprises:
estimating a fracture width or length after pumping the first diverter into the wellbore using the onset of pressure response value, wherein selecting the second diverter of the set of diverters to be pumped into the wellbore is based on the fracture width or length.

14. The computer-implemented method of claim 13, further comprising:
determining, by dividing the fracture width or length by a quantity of diverter stages in the diverter schedule, a distance along the fracture length or width in which to generate complexity.

15. The computer-implemented method of claim 10, wherein selecting the second diverter of the set of diverters to be pumped into the wellbore comprises:
identifying, using the diverter schedule, the second diverter of the set of diverters that is scheduled to be pumped into the wellbore after the first diverter;
determining that the onset of pressure response value is less than a first onset of pressure response threshold value associated with the first diverter and greater than a second onset of pressure response threshold value associated with the second diverter; and
selecting, based on determining that the onset of pressure response value is less than the first onset of pressure response threshold value associated with the first diverter and greater than the second onset of pressure response threshold value associated with the second diverter.

16. The computer-implemented method of claim 10, wherein selecting the second diverter of the set of diverters to be pumped into the wellbore comprises:
identifying, using the diverter schedule, a proposed second diverter of the set of diverters that is scheduled to be pumped into the wellbore after the first diverter;
determining that the onset of pressure response value is below a first onset of pressure response threshold value associated with the proposed second diverter; and
selecting, from the set of diverters and based on determining that the onset of pressure response value is below the first onset of pressure response threshold value associated with the proposed second diverter, the second diverter to be pumped into the wellbore, the second diverter being associated with a second onset of pressure response threshold value that is exceeded by the onset of pressure response value.

17. The computer-implemented method of claim 10, further comprising:
measuring a second onset of pressure response value using the pressure sensor during or after pumping the second diverter into the wellbore;
selecting a third diverter using the second onset of pressure response value and the diverter schedule, the third diverter including matter corresponding to one or more third mesh values, an average of the one or more third mesh values being smaller than an average of the one or more first mesh values and an average of the one or more second mesh values; and
pumping the third diverter into the wellbore.

18. The computer-implemented method of claim 10, further comprising:
determining, using the diverter schedule, a mass of a proppant to pump into the wellbore before or after each diverter of the set of diverters scheduled to be pumped into the wellbore, wherein the mass of the proppant is determined, in part, by a quantity of diverter stages in the diverter schedule.

19. A non-transitory computer-readable medium comprising instructions that when executed by a processing device, cause the processing device to perform operations including:

defining a diverter schedule to systemically generate complexity in a formation, the diverter schedule including a set of diverters to be pumped into a wellbore over a duration of time;

pumping a first diverter of the set of diverters into the wellbore, the first diverter including matter corresponding to one or more first mesh values;

determining an onset of pressure response value using a measurement by a pressure sensor during or after pumping the first diverter into the wellbore, wherein the onset of pressure response value is defined as an amount of time between pumping a material into the wellbore and an increase in pressure detected by the pressure sensor;

selecting a second diverter of the set of diverters using the onset of pressure response value and the diverter schedule, the second diverter including matter corresponding to one or more second mesh values; and pumping the second diverter into the wellbore.

20. The non-transitory computer-readable medium of claim 19, wherein a mass of the first diverter is approximately the same as a mass of the second diverter, and wherein an average of the one or more second mesh values is less than an average of the one or more first mesh values.

21. The non-transitory computer-readable medium of claim 19, wherein a mass of the first diverter is different from a mass of the second diverter, and wherein an average of the one or more second mesh values is less than an average of the one or more first mesh values.

22. The non-transitory computer-readable medium of claim 19, wherein selecting the second diverter of the set of diverters to be pumped into the wellbore comprises:

estimating a fracture width or length after pumping the first diverter into the wellbore using the onset of pressure response value, wherein selecting the second diverter of the set of diverters to be pumped into the wellbore is based on the fracture width or length.

23. The non-transitory computer-readable medium of claim 19, wherein selecting the second diverter of the set of diverters to be pumped into the wellbore comprises:

identifying, using the diverter schedule, the second diverter of the set of diverters that is scheduled to be pumped into the wellbore after the first diverter;

determining that the onset of pressure response value is less than a first onset of pressure response threshold value associated with the first diverter and greater than a second onset of pressure response threshold value associated with the second diverter; and selecting, based on determining that the onset of pressure response value is greater than the first onset of pressure response threshold value associated with the first diverter and less than the second onset of pressure response threshold value associated with the second diverter.

24. The non-transitory computer-readable medium of claim 19, wherein selecting the second diverter of the set of diverters to be pumped into the wellbore comprises:

identifying, using the diverter schedule, a proposed second diverter of the set of diverters that is scheduled to be pumped into the wellbore after the first diverter;

determining that the onset of pressure response value is below a first onset of pressure response threshold value associated with the proposed second diverter; and selecting, from the set of diverters and based on determining that the onset of pressure response value is below the first onset of pressure response threshold value associated with the proposed second diverter, the second diverter to be pumped into the wellbore, the second diverter being associated with a second onset of pressure response threshold value that is exceeded by the onset of pressure response value.

25. The non-transitory computer-readable medium of claim 19, further comprising:

measuring a second onset of pressure response value using the pressure sensor during or after pumping the second diverter into the wellbore;

selecting a third diverter using the second onset of pressure response value and the diverter schedule, the third diverter including matter corresponding to one or more third mesh values, an average of the one or more third mesh values being smaller than an average of the one or more first mesh values and an average of the one or more second mesh values; and pumping the third diverter into the wellbore.

26. The non-transitory computer-readable medium of claim 22, further comprising:

determining, by dividing the fracture width or length by a quantity of diverter stages in the diverter schedule, a distance along the fracture length or width in which to generate complexity.

* * * * *